(12) United States Patent
Leventu et al.

(10) Patent No.: US 8,239,904 B2
(45) Date of Patent: Aug. 7, 2012

(54) VIDEO PATH CONFIRMATION

(75) Inventors: Lucian Leventu, Bucharest (RO); Razvan Stan, Calabasas, CA (US)

(73) Assignee: Ixia, Calabasas, CA (US)

( * ) Notice: Subject to any disclaimer, the term of this patent is extended or adjusted under 35 U.S.C. 154(b) by 422 days.

(21) Appl. No.: 12/608,885

(22) Filed: Oct. 29, 2009

(65) Prior Publication Data

US 2011/0102602 A1 May 5, 2011

(51) Int. Cl.
*H04N 7/173* (2006.01)
*H04N 17/00* (2006.01)
*H04N 17/02* (2006.01)

(52) U.S. Cl. ............... 725/107; 702/108; 348/192
(58) Field of Classification Search ............ None
See application file for complete search history.

(56) References Cited

U.S. PATENT DOCUMENTS

| | | | |
|---|---|---|---|
| 6,741,569 B1 | 5/2004 | Clark | |
| 7,075,981 B1 * | 7/2006 | Clark | 375/224 |
| 7,275,255 B2 * | 9/2007 | Suda et al. | 725/80 |
| 7,583,613 B2 | 9/2009 | Klotz et al. | |
| 2002/0095673 A1 * | 7/2002 | Leung et al. | 725/25 |
| 2003/0058229 A1 * | 3/2003 | Kawabe et al. | 345/204 |
| 2003/0086001 A1 * | 5/2003 | Zeidler | 348/183 |
| 2007/0002069 A1 * | 1/2007 | Hoppe et al. | 345/582 |
| 2008/0095286 A1 * | 4/2008 | Lieuwen | 375/354 |
| 2009/0041114 A1 | 2/2009 | Clark | |

OTHER PUBLICATIONS

Brix Networks, GPS, CDMA, and NTP Alternatives Acurately Measure One-Way Network Delay, VoIP Quality and Video Performance, Brix Networks News and Events, Press Release, Sep. 30, 2002.

* cited by examiner

*Primary Examiner* — Mark D Featherstone
(74) *Attorney, Agent, or Firm* — SoCal IP Law Group LLP; Steven C. Sereboff; John E. Gunther (57) ABSTRACT

There is disclosed a method, device, and system for verifying a video path between a source device and a destination device. The destination device may receive a video signal including at least one video test pattern from the source device via a network. The destination device may automatically judge that a video path exists if the received video signal meets at least one predetermined criteria.

9 Claims, 7 Drawing Sheets

VIDEO PATH CONFIRMATION

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to testing a communications network and specifically to verify that a video path exists between two devices connected to the network.

2. Description of the Related Art

Traditionally, video images were transmitted from a central location to video receivers via wireless broadcasting or though primarily unidirectional communications networks such as cable television distribution systems. However nontraditional video-capable communications devices have proliferated in recent years. Devices such as personal computers, e-mail appliances, web appliances, and cellular telephones are capable of receiving and displaying video images. In many cases, these devices are also capable of capturing and transmitting video images.

With the exception of analog public broadcasting and cable TV systems, video images are typically transmitted over a network in the form of digital packets. The video signal is first coded using an algorithm that compresses the bandwidth of the signal. The coded video signal is then encapsulated in packets, each of which contains a portion of the original signal. The packets are then routed through the network to a destination device. Upon receipt at the destination device, the packets are reassembled and decoded to reconstruct the video signal.

The transmission of video information through a network is more complex than the transmission of simpler digital information. The existence of a path between two devices for e-mail or text messages may not confirm the existence of a video path between the same two devices. For example, a video path may not exist because of incompatibility between the coder at the transmitting device and the decoder at the receiving device. In addition, the transmission of video information can be degraded or precluded by excessive numbers of damaged, lost, or out-of-sequence packets.

Throughout this description, elements appearing in block diagrams are assigned three-digit reference designators, where the most significant digit is the figure number and the two least significant digits are specific to the element. An element that is not described in conjunction with a block diagram may be presumed to have the same characteristics and function as a previously-described element having a reference designator with the same least significant digits.

DETAILED DESCRIPTION

Description of Apparatus

Figure 1:
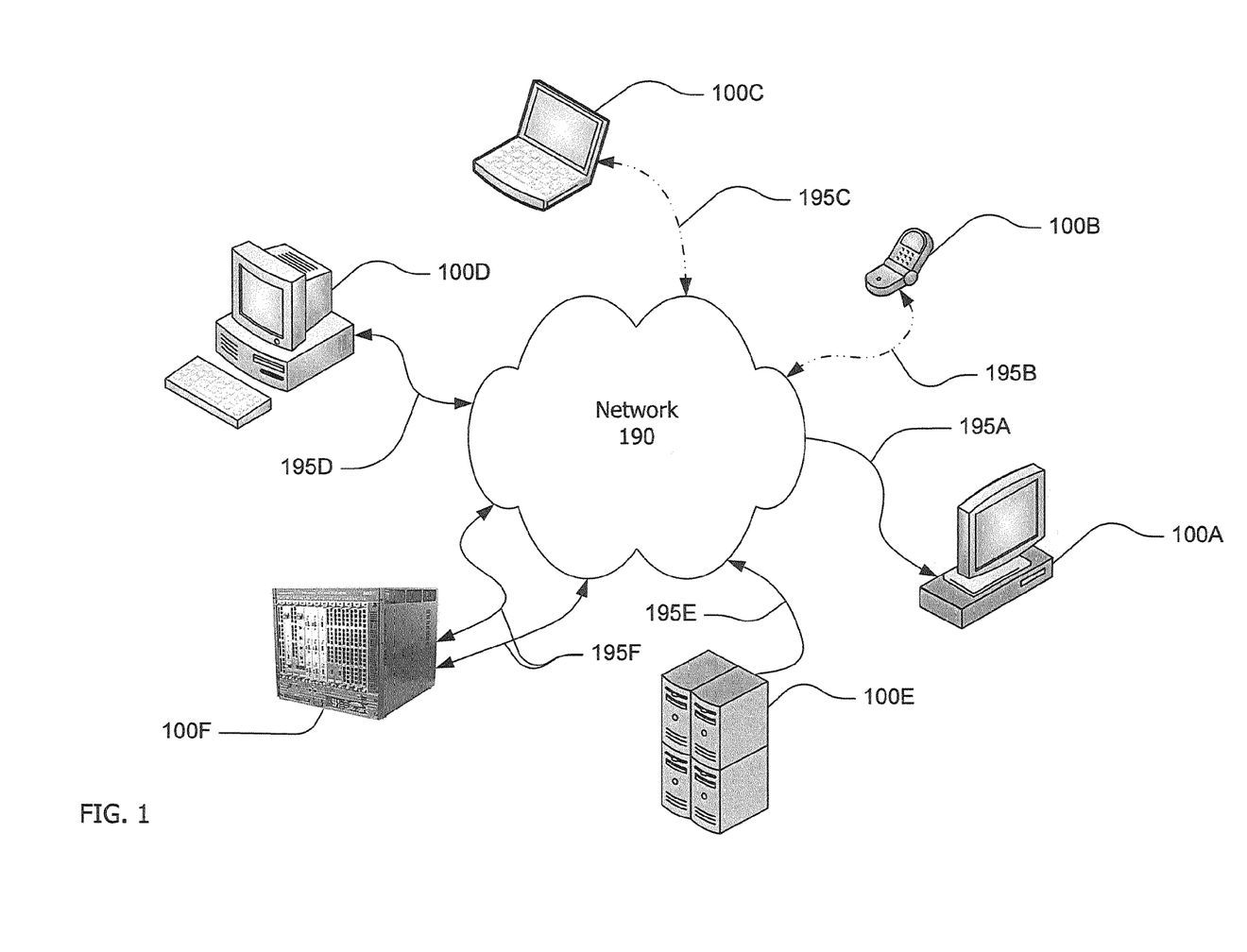
FIG. 1 is a block diagram of a network environment.

FIG. 1 shows a block diagram of a network environment. The environment may include a network 190 and plural video-capable network devices 100A-100F connected to the network 190 by respective links 195A-195F. The video-capable network devices may include, for example and without limitation, set-top boxes 100A coupled to television monitors, cellular phones 100B, portable computers 100C, personal computers 100D, media servers 100E, and network test equipment 100F. Links 195B, 195C to cellular phone 100B and portable computer 100C may typically be wireless links. Links 195A, 195D, 195E, 195F may commonly be wired or fiber optic links but may also be wholly or partially wireless links.

The network 190 may be a local area network, a wide area network, a cable television distribution network, a proprietary network, and combinations of these and other networks. The network 190 may be or include the Internet. Video content may be communicated over the network in the form of packets conforming to one or more communications protocols. For example, video content is commonly communicated over the Internet using a combination of the Real Time Protocol, User Datagram Protocol, and Internet Protocol. These and other protocols may be used to communicate video content over other networks.

Communications of video content from media servers 100E to the network 190 and from the network 190 to set-top boxes 100A may be unidirectional. Other devices, including cellular phones 100B, portable computers 100C, and personal computers 100D may both transmit and receive video content.

The network test equipment 100F may be a network testing device, performance analyzer, conformance validation system, network analyzer, or network management system. The network test equipment 100F may have a plurality of links 195F to the network 190, each of which may be used to transmit video content, receive video content, or both transmit and receive video content.

Figure 2:
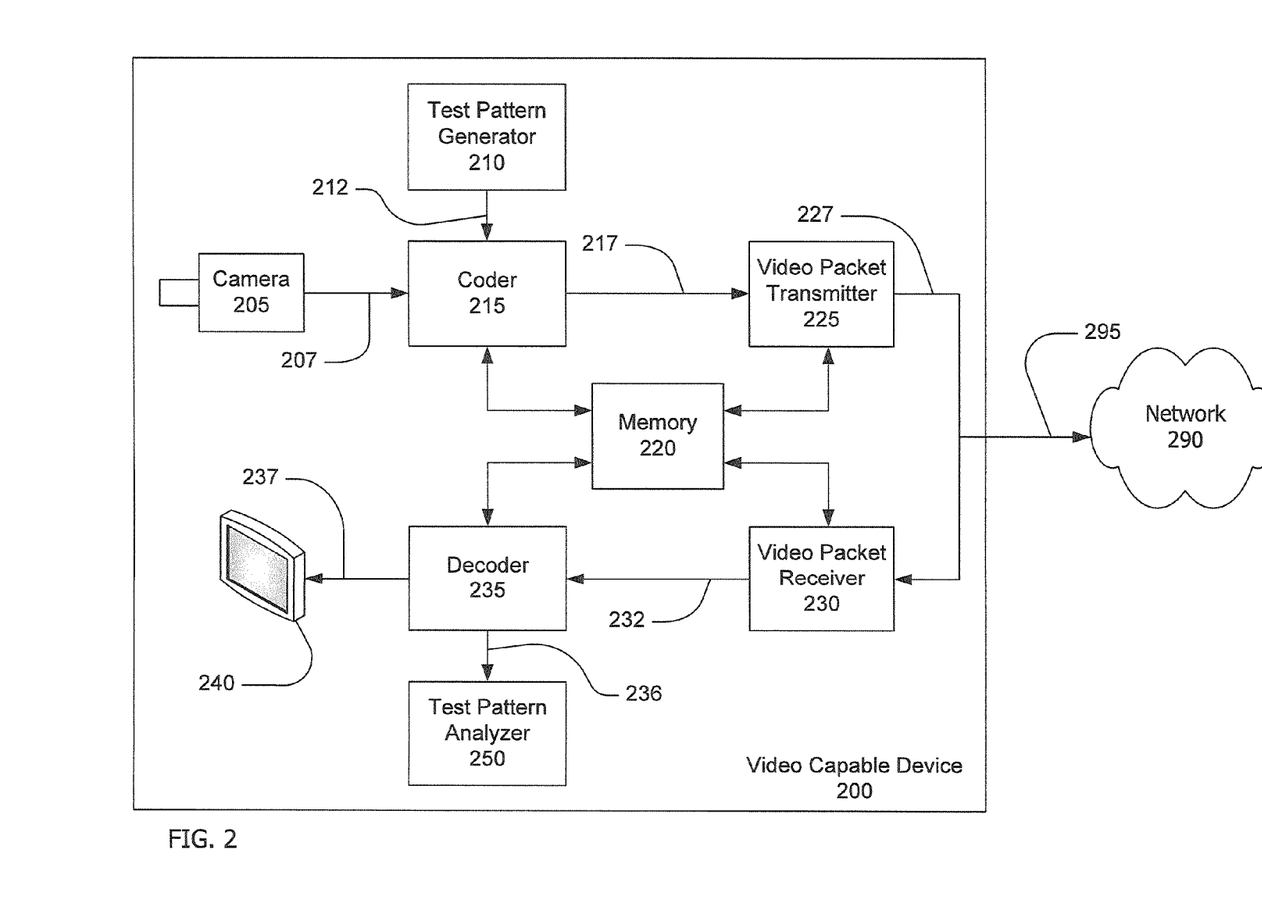
FIG. 2 is a block diagram of a video device.

Referring now to FIG. 2, a generalized video-capable network device 200 may be capable of transmitting video content to a network 290 and/or receiving video content from the network 290. The video-capable network device 200 may be any of the devices 100A-100F depicted in FIG. 1 or some other device.

The video-capable network device 200 may include a camera 205 to provide a video signal 207 representative of a scene viewed by the camera. The video signal 207 may be an analog signal or a digital signal. The video signal 207 may be a monochromatic signal or, a color signal. If color, the video signal 207 may include three components corresponding to coordinates in a predetermined color space. Digitized images are typically comprised of a two-dimensional array of picture elements, or pixels. Each pixel may consist of red, green and blue sub-pixels. Internal to the camera 205, the brightness of the red, green, and blue sub-pixels may be indicated corresponding red, green and blue video signals. The relative amplitudes of the red, green, and blue video signals may be considered to define the appearance of a pixel in a three-dimensional red-green-blue (RGB) color space. However, the resolution of the human eye, both spatially and for color differences, is highly dependent on color. Thus, to conserve bandwidth and/or storage size, the RGB color space is commonly mapped to some other three-dimensional color space prior to transmitting analog or digital video content and/or prior to storing digital video content. A color space commonly used for digital video signals is the YUV color space. Other color spaces, including RGB, Y'UV, YCrCb, and YPbPr color spaces may be used in some applications and/or equipment. In all cases, the color and brightness of a pixel may be defined by three coordinates indicating a position within the three-dimensional color space. Regardless of the choice of color space, the video signal 207 will have three signal components corresponding to the three coordinates.

The three components of the video signal 207 from the camera 205 may be coded by a coder 215. The coder 215 may code the video signal in accordance with a standard, which may be, for example, the MPEG-4 standard developed by the ISO/IEC Moving Picture Experts Group. Coded video content 217 may be output from the coder 215 in the form of packets, or may be converted into packets by a video packet transmitter 225. The video packet transmitter may transmit outgoing packets 227 to a destination via the network 290.

The video-capable network device 200 may also include a test pattern generator 210 adapted to generate a test video signal 212 conveying one or more test patterns to be used for verifying a video path from the video-capable network device 200 to a selected destination. The test video signal 212 may have three components as described with respect to the video signal 207. When a path confirmation test is initiated, the test video signal 212 from the test pattern generator 210 may be coded by the coder 215, converted into packets, and transmitted to an intended destination by the packet transmitter 225.

The video-capable network device 200 may also include a video packet receiver 230 to receive packets from the network 290. Received packets 232 may be decoded by a decoder 235. The decoded video signal 237 may include three components as previously described. The decoded video signal 237 may be displayed on a display device 240.

The video-capable network device 200 may also include an automatic test pattern analyzer 250 adapted to analyze a test video signal 236 conveying one or more test patterns received from the network 290 to confirm a video path from a source (not shown) to the video-capable network device 200.

The video-capable network device 200 may include at least one memory 220 to store packets and intermediate results of the coding and decoding operations. The video capable device may include other elements and features not shown in FIG. 2, such as a microphone, a speaker, a keyboard, and other elements.

The video-capable network device 200 may include hardware and software for providing functionality and features described herein. The video-capable network device 200 may therefore include analog circuits, digital circuits, software, firmware, and processors such as microprocessors, digital signal processor, field programmable gate arrays (FPGAs), application specific integrated circuits (ASICs), programmable logic devices (PLDs) and programmable logic arrays (PLAs). The depiction of the video-capable network device 200 as functional elements in FIG. 2 does not imply a corresponding physical separation or demarcation. All or portions of the test pattern generator 210, the coder 215, the video packet transmitter 225, the video packet receiver 230, the decoder 235, and the test pattern analyzer 250 may be implemented using a common integrated circuit chip and/or by software running on a common processor. The hardware and software and their functions may be distributed such that some functional elements may be implemented by one or more processors and other elements by other devices.

Figure 3:
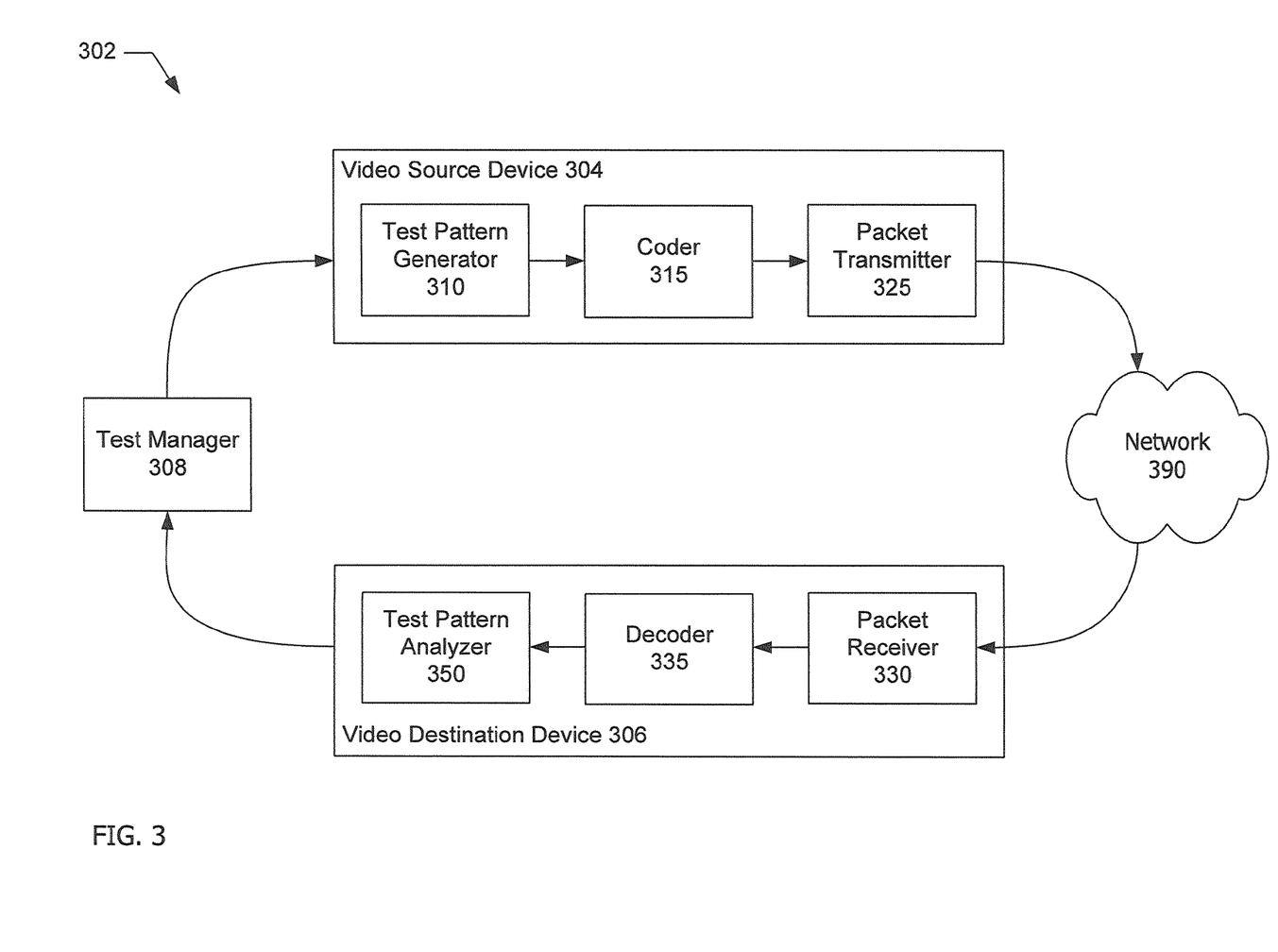
FIG. 3 is a block diagram of a video path verification system.

FIG. 3 is a block diagram of a system 302 for performing a video path verification test to confirm the existence of a video path from a video source device 304 to a video destination device 306 through a network 390. The video source device 304 and the video destination device 306 may each be a video-capable network device such as the video-capable network device 200. The video source device 304 may include a test pattern generator 310, a coder 315, and a packet transmitter 325. The video destination device may include a packet receiver 330, a decoder 335, and an automatic test pattern analyzer 350. To conduct a video path verification test, the video source device 304 may generate, code, packetize, and transmit a test video signal including one or more test patterns one or more test patterns to the video destination device 306. The video destination device 306 may receive, decode, and analyze the video test patterns to automatically verify that video path exists through the network 390.

The test pattern analyzer 350 may automatically judge that a video path exists between the video source device 304 and the video destination device 306 if a received test pattern meets at least one or more criteria. In this context "automatically" means without operator involvement. Specifically, the automatic test pattern analyzer 350 may judge that a video path exists or does not exist without displaying the one or more test patterns and receiving feedback from a viewer.

A test manager 308 may instruct the video source device 304 to initiate a path verification test to verify a video path from the video source device 304 to the video destination device 306. The test manager 308 may receive the results of the path verification test from the video destination device 306. The test manager 308 may include an operator interface (not shown) to receive an instruction to perform the path verification test from an operator and to convey the result of the test to the operator.

The test manager 308 may be a third device or system, physically separate and under separate control from the video source device 304 and the video destination device 306. For example, the test manager 308 may be operated by a network service provider or cable television provider to test the network 390. When physically separate, the test manager 308 may communicate the video source device 304 and the video destination device 306 via the network 390 or via some other connection.

The test manager 308 may be a portion of the video source device 304, in which case the path confirmation test may be initiated by, and reported to, an operator of the video source device. For example, a cell phone user may initiate a video path confirmation test prior to sending video images to a destination. When the test manager 308 is a portion of the video source device 304, the test results may be communicated from the video destination device 306 to the video source device 304 via the network 390.

The test manager 308 may be a portion of the video destination device 306, in which case the path confirmation test may be initiated by, and reported to, an operator of the video destination device. When the test manager 308 is a portion of the video destination device 306, a request to initiate a path confirmation test may be communicated from the video destination device 306 to the video source device 304 via the network 390.

A video-capable network device such as the device 200 may be adapted to send video test patterns through a network to itself and thus perform a self-test of its own capabilities. In this case, the video source device 304, the video destination device 306, and the test manager 308 may all be portions of the same video-capable network device.

Figure 4:
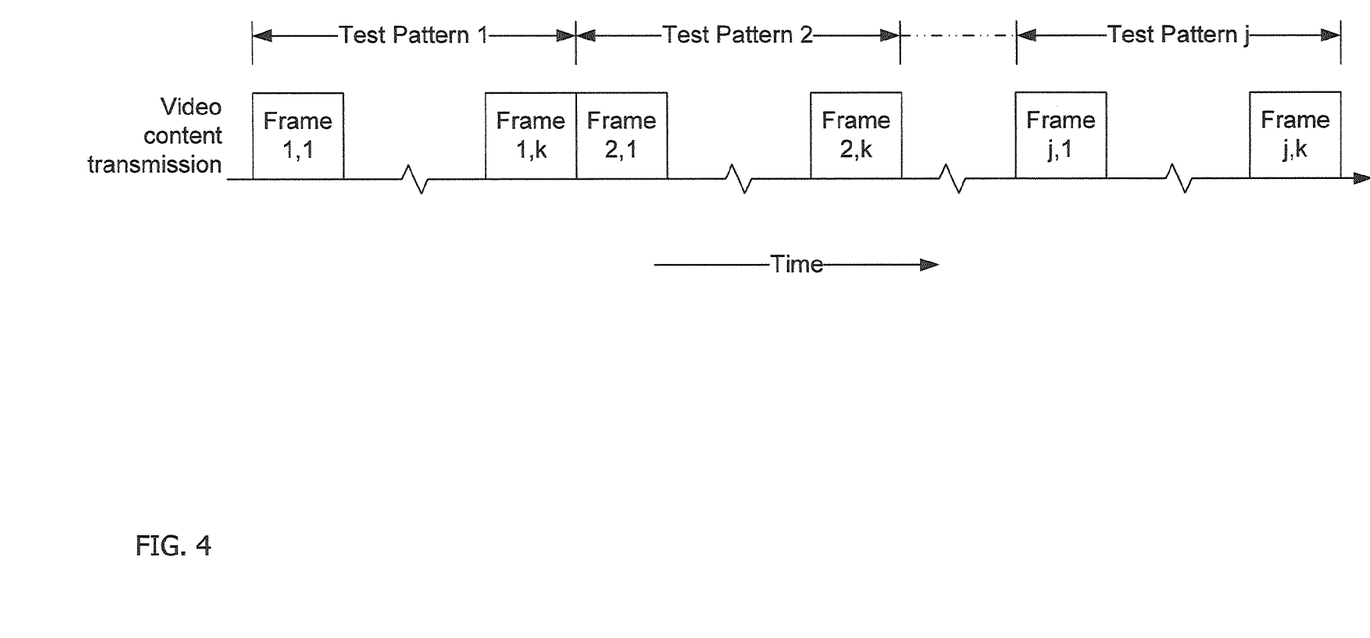
FIG. 4 is a timing diagram for transmitting test patterns.

FIG. 4 shows a timing diagram for an exemplary video path verification test. The exemplary video path verification test may include a video source device, such as the video source device 304, transmitting one or more test patterns (identified as Test Pattern 1 through Test Pattern j). Each test pattern may be transmitted for k consecutive frames, where k is an integer greater than one. The required number of consecutive frames may depend on the time required for a video destination device, such as the video destination device 306, to analyze each test pattern, which may in turn depend on the processing resources within the video destination device. Thus k may be set to different values depending on the characteristics of the video destination device. For example, at the start of a video path confirmation test, the video destination device may inform the video source device and/or a test manager, such as the test manager 308, of the number of frames necessary to analyze a test pattern.

Figure 5A:
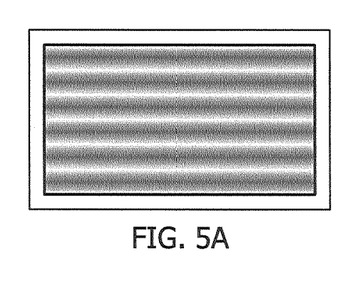
FIG. 5A is example of a video test pattern.
Figure 5B:
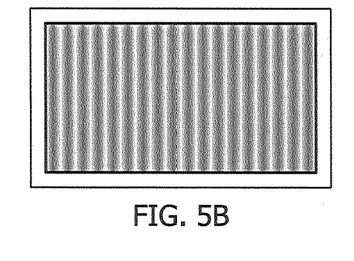
FIG. 5B is example of a video test pattern.
Figure 5C:
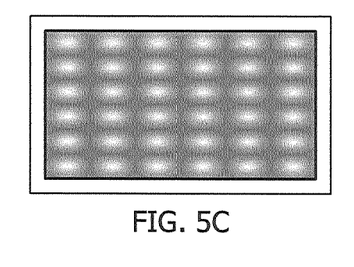
FIG. 5C is example of a video test pattern.

FIG. 5A, FIG. 5B, and FIG. 5C depict exemplary video test patterns that may be generated by the test pattern generators 210, 310. FIG. 5A shows the displayed image of a test pattern having sinusoidal spatial modulation of at least one component of a video signal in a vertical direction. FIG. 5B shows the displayed image of a test pattern having sinusoidal spatial modulation of at least one component of a video signal in a horizontal direction. FIG. 5C shows the displayed image of a test pattern having sinusoidal spatial modulation at a first spatial frequency of at least one component of a video signal in the vertical direction and sinusoidal spatial modulation at a second special frequency of at least one component of the video signal in the horizontal direction. To generate the test pattern of FIG. 5C, one or more of the components of the video signal may be defined by $$x(i, j) = 0.5\, X_{max}\left[\sin\left(\frac{2\pi}{T_1} i\right) + \sin\left(\frac{2\pi}{T_2} j\right)\right] \quad (1)$$

where:
- i and j are coordinates in a two-dimensional array of pixels;
- x(i,j) is the value of a component (Y, U, or V) of the video signal for pixel i,j;
- $X_{max}$ is a maximum value for the video component x; and
- $T_1$ and $T_2$ are periods of the horizontal and vertical sinusoidal modulation in pixels.

Test patterns having sinusoidal spatial modulation, such as the test patterns shown in FIGS. 5A-5C, may be relatively easy to generate and, as will be discussed subsequently, relatively easy to analyze. However, other test pattern formats may be used for video path verification instead of, or in addition to, sinusoidal spatial modulation.

A test pattern having sinusoidal spatial modulation may be analyzed by filtering the video signal through a band-pass filter tuned to the expected sinusoidal period, and then comparing the signal amplitude at the output of the filter to an expected value. The band-pass filter may remove essentially all signal components other than a component at the expected sinusoidal period, such that the filter output will be low for any pattern other than the anticipated sinusoidal modulation. A suitable band-pass filter may be implemented, for example, by a digital signal processor executing known algorithms. The band-pass filter may be implemented as a finite impulse response or infinite impulse response filter. Within each category, several known algorithms (Butterworth, Chebyshev Type I, Chebyshev Type II, etc.) may be used. The algorithm and order of the band-pass filter may be selected as a compromise between the desired narrow bandwidth and the computational resources and processing time required to execute a high-order filter. The band-pass filter may be implemented using a technique, such as Goertzel's method, that essentially calculates a single fast Fourier transform (FFT) bin centered at a known frequency.

Video test patterns that have both vertical and horizontal spatial modulation may be analyzed using separate vertical and horizontal narrow-band filters. Each of the vertical and horizontal narrow-band filters may be matched to the respective expected spatial modulation frequency.

An entire frame of a received video test pattern may be analyzed. In this case, a judgment that a video path exists may be made if the energy output from each narrow band filter, integrated over the video frame, exceeds a predetermined threshold.

Figure 5D:
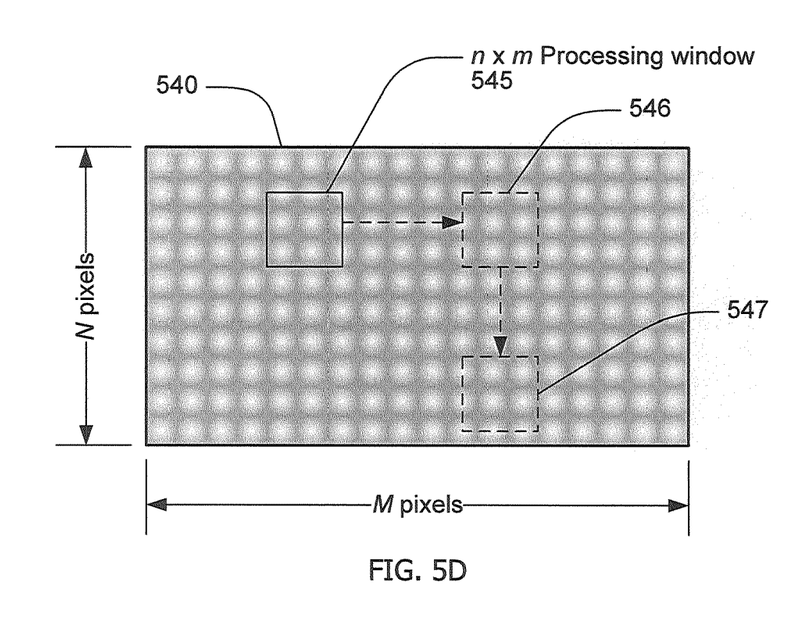
FIG. 5D is example of moving analysis window.

As shown in FIG. 5D a windowed filter may be used to analyze test patterns. An entire video frame 540 may include a matrix of N rows of M pixels. The narrow-band filter may be applied to a subset of the total number of pixels defined by a processing widow 545 containing n rows of m pixels. The processing window 545 may subsequently be moved to other positions 546, 547 within the video frame 540. For example, the processing window 545 may be stepped progressively across the video frame 540 such that the entire video frame is eventually analyzed. In this case, a total of at least (N×M)/(n×m) steps may be required to analyze the entire video frame 540. The processing window 545 may be moved to a smaller number of predetermined positions within the video frame 540.

When a processing window is used to analyze a video frame in K steps, each of the K portions of the video test pattern may be judged as acceptably received if the energy output from each narrow band filter, integrated over the processing window, exceeds a predetermined threshold. In this case, a judgment that a video path exists may be made if all of the K windowed portions of the video test pattern are acceptably received. Alternatively, a judgment that a video path exists may be made if at least a predetermined fraction of the K windowed portions of the video test pattern are acceptably received.

Figure 6:
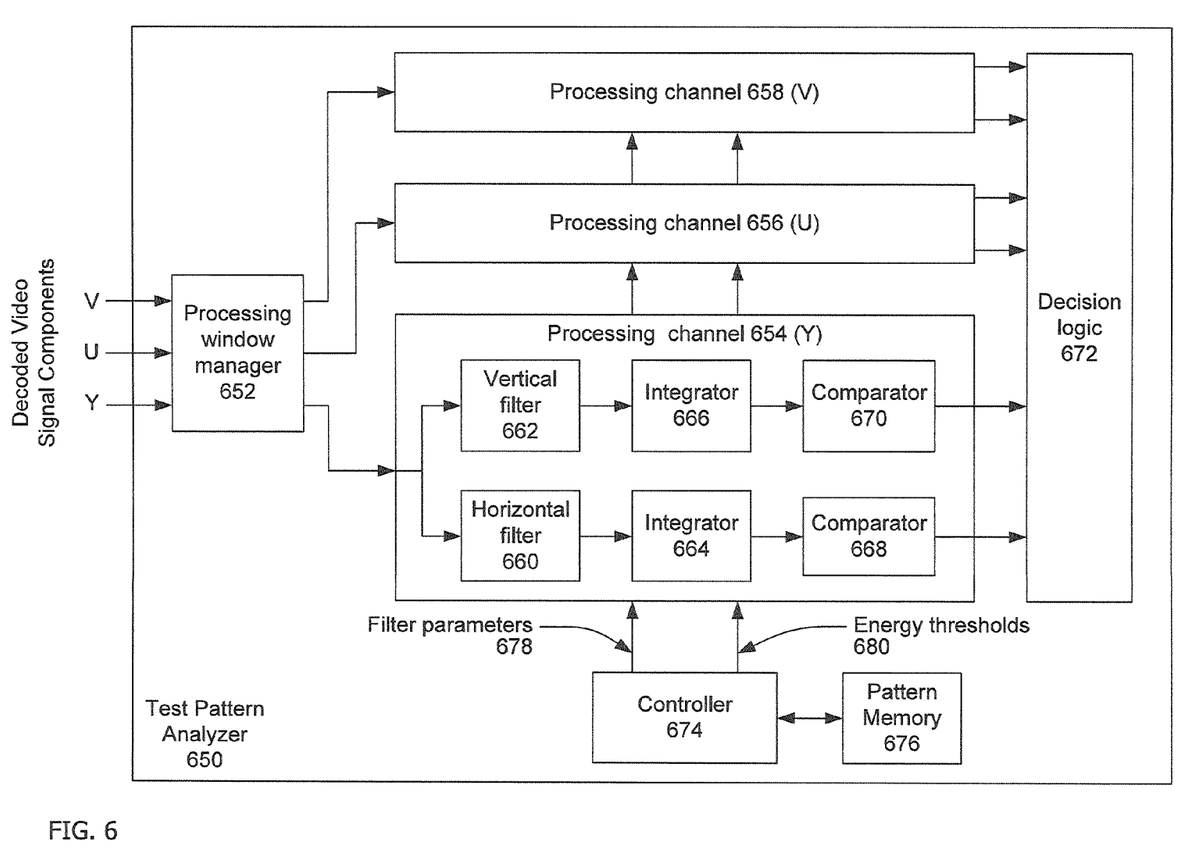
FIG. 6 is a block diagram of a test pattern analyzer.

FIG. 6 is a functional block diagram of an exemplary test pattern analyzer 650, which may be suitable for the test pattern analyzer 250 or 350. The exemplary test pattern analyzer 650 may include a processing window manager 652, three processing channels 654, 656, 658, decision logic 672, and a controller 674 coupled to a pattern memory 676. In the example of FIG. 6, three processing channels 654, 656, 658 are dedicated to processing Y, U, and V components, respectively, of a decoded video signal. It should be understood that a color space other than the YUV color space may be used for the video signal, in which case the three processing channels 654, 656, 658 may be dedicated to three signal components of the other color space.

The three processing channels 654, 656, 658 of the test pattern analyzer 650 may process the Y, U, and V signal components concurrently. However, a test pattern analyzer may have less than three processing channels. For example, a test pattern analyzer may have only a single processing channel used to process three video signal components sequentially.

The processing window manager 652 may select a portion of a video frame for analysis, as indicated by the processing window 545 in FIG. 5D, and may extract the video signal information corresponding to the processing window. The processing window manager 652 may progressively relocate the processing window such that additional portions of the video frame may be analyzed in sequence.

Processing channel 654, which may be representative of processing channels 656 and 658, may include a vertical filter 662, an integrator 666 that receives the output from the vertical filter 662, and a comparator 670 that compares the output from the integrator 666 to a threshold provided by the controller 674. Processing channel 654 may include a horizontal filter 660, an integrator 664 that receives the output from the vertical filter 660, and a comparator 668 that compares the output from the integrator 664 to a threshold provided by the controller 674.

The vertical filter 662 may filter the video signal in accordance with at least one vertical filter parameter provided by the controller 674. For example, the controller 674 may provide a center spatial frequency for the vertical filter 662, or may provide a plurality of parameters used by the vertical filter 662 to implement the required band-pass filter function. The horizontal filter 660 may filter the video signal in accordance with at least one horizontal filter parameter provided by the controller 674. For example, the controller 674 may provide a center spatial frequency for the horizontal filter 660, or may provide a plurality of parameters used by the horizontal filter 660 to implement the required band-pass filter function.

The integrator 666 and the integrator 664 may calculate a mean-square sum of the outputs of the vertical filter 662 and the horizontal filter 660, respectively, for each processing window position set by the processing window controller 652. For example, the integrators 666, 664 may calculate the mean-square sum in accordance with the formula $$E_x = \frac{1}{n}\frac{1}{m}\sum_{i=1}^{m}\sum_{j=1}^{n} x_f^2(i, j) \quad (2)$$

where:
- $E_x$ is the signal energy, integrated over an n×m pixel processing window, for the horizontal or vertical modulation of a component of the video signal, where E may be Y, U, or V, and x may be v or h;
- i and j are coordinates of a pixel within the n×m processing window; and
- $x_f(i, j)$ is the value of the filtered video signal component at pixel (i, j).

The comparator 670 and the comparator 668 may compare the outputs of the integrator 666 and the integrator 664, respectively, to a threshold value provided by the controller 674 for each processing window position set by the processing window controller 652. For example, the comparators 670 and 668 may determine that the output of an integrator is acceptable for a given processing window if the following relationship is true:

$$E_{x,r} \geq pE_{x,t} \quad (3)$$

where:
- $E_{x,r}$ is the signal energy, integrated over an n×m pixel processing window, for the horizontal or vertical modulation of a component of the received video signal, where E may be Y, U, or V, and x may be v or h;
- $E_{x,t}$ is the signal energy, integrated over an n×m pixel processing window, for the horizontal or vertical modulation of the component of the transmitted video signal; and
- p is a proportionality constant, less than 1.0, indicative of an allowable level of signal degradation; where the threshold value provide by the controller 674 is equal to $pE_{x,t}$.

The decision logic 672 may receive outputs from comparator 670, comparator 668, and corresponding comparators in the U processing channel 656 and the V processing channel 658 for each position of the processing window set by the processing window controller 652. The decision logic may decide that a test pattern has been successfully received based on the combined comparator outputs for all positions of the processing window. For example, the decision logic may decide that the test pattern has been successfully received if all of the comparator outputs exceed the respective thresholds for every position of the process window, for every position except one, for 90% or 50% of the positions of the processing window, or by some other criterion. The decision logic may send a signal or message to a test manager, such as the test manager 385, reporting if the test pattern was received or not received successfully.

Description of Processes

Figure 7:
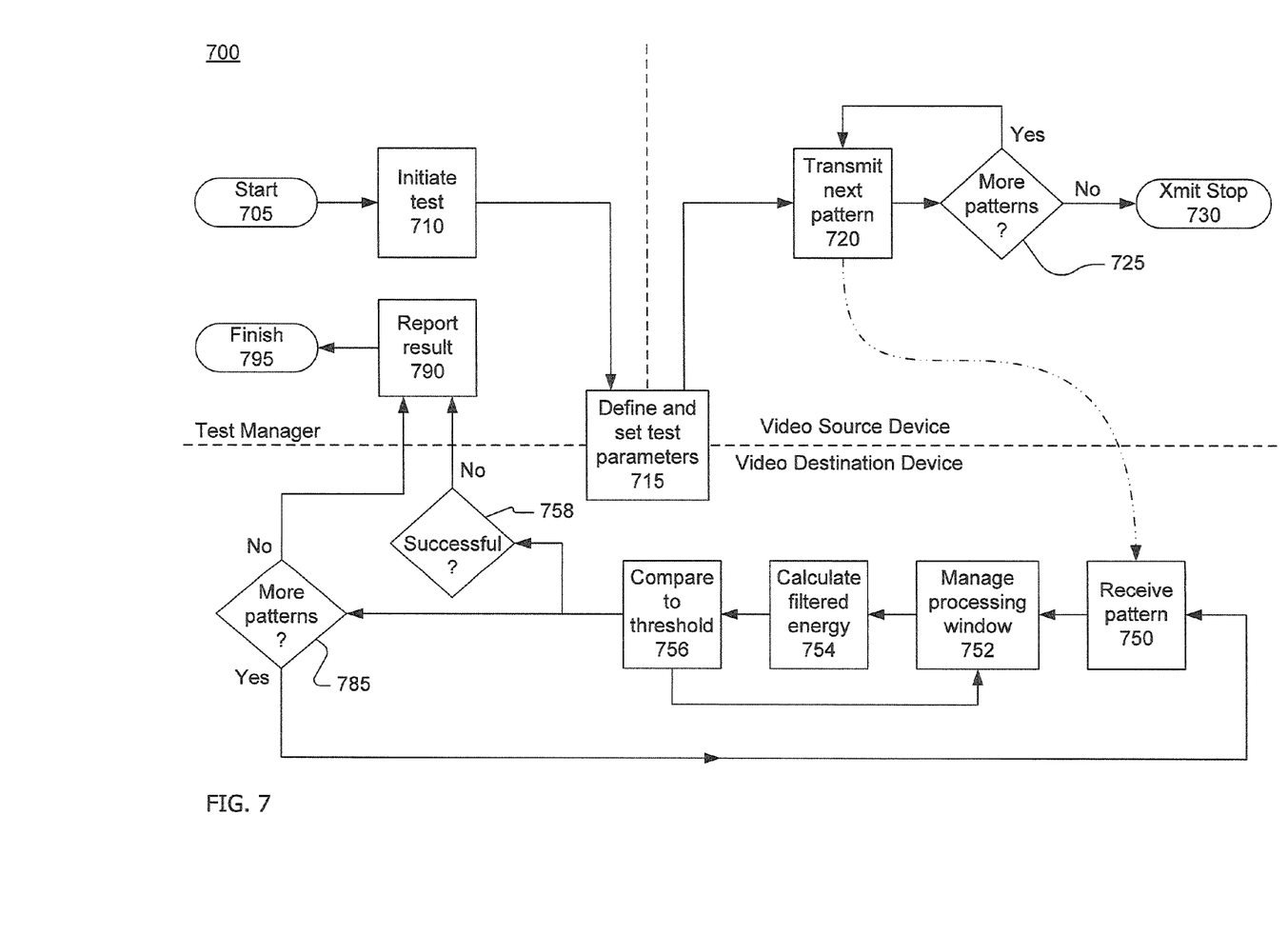
FIG. 7 is a flow diagram of a process for verifying a video path.

Referring now to FIG. 7, a process 700 for conducting a video path confirmation test may be performed by a source device such as the source device 304, a destination device such as the destination device 306, and a test manager such as the test manager 385. The test manager may be an independent device or a portion of either the source device or the destination device.

The process 700 may start at 705, for example in response to an operator request, and may end at 795 after a result of the path confirmation test is reported. At 710, the test may be initiated by the test manager by sending messages to the video source device and the video destination device requesting that a path confirmation test be performed. Test parameters for the video path confirmation test may be defined at 715. All or some test parameters may be defined at 715 by negotiation between the test manager, the video source device and the video destination device. The test parameters to be negotiated may include, for example the number of video test patterns to be transmitted, the duration of transmission for each test pattern, and other parameters necessary to conduct the video path confirmation test. Specific details of the test patterns, such as the spatial frequency of modulation to be applied to the components of the video signal, may be negotiated at 715 or may be predetermined and stored at both the video source device and the video destination device. All parameters for the video path confirmation test, including the number and duration of test patterns, may be predetermined and stored, in which case all or some test parameters may be defined at 715 by retrieving the stored predetermined parameters. The defined test parameters may then be set in both the video source device and the video destination device.

After the test parameters are defined and set at 715, the video source device may transmit a first test pattern at 720. The first test pattern may be transmitted for a plurality of video frames in accordance with the defined test parameters. When the transmission of the first test pattern is complete, a decision may be made at 725 if additional test patterns are to be transmitted in accordance with the defined test parameters. If additional test patterns are to be transmitted, the next test pattern may be transmitted at 720. The actions at 720 and 725 may be repeated cyclically until all test patterns have been transmitted. When all test patterns have been transmitted, the video source device may stop transmitting at 730.

Each of the test patterns transmitted at 720 may be, for example, a three-component video signal having periodic sinusoidal spatial modulation of one or more component of the video signal in the vertical and/or horizontal directions. Each of a plurality of test patterns transmitted at 720 may differ from each other of the video test patterns in an amplitude of the periodic spatial modulation and/or the frequency of the periodic spatial modulation applied to one or more of the three components of the video signal.

The test patterns transmitted at 720 may be received, essentially concurrently, by the video destination device at 750. Each received test pattern may be analyzed from 572 to 758, for example by a test pattern analyzer such as the test pattern analyzer 650.

At 752, a specific position of a processing window may be defined, for example by the processing window manager 652. For test patterns having sinusoidal modulation at a predetermined spatial frequency, the signal energy at the predetermined spatial frequency may then be calculated over the processing window, for example using formula (2), at 754. The action at 754 may be performed, for example, by one or more narrow-band filters, such as the filters 660, 662, and corresponding integrators, such as the integrators 664, 666. The result from 754 compared to a threshold at 756. The actions from 752 to 756 may be repeated cyclically for a plurality of positions for the processing window.

At 758, a determination may be made if the test pattern was, or was not, received successfully based on the results from 756 for the plurality of positions of the processing window. For example, a determination may be made at 758 that the test pattern has been successfully received if all of the outputs from 756 indicate that the filtered energies from 754 exceed the respective thresholds for every position of the process window, for every position except one, for 90% or 50% of the positions of the processing window, or by some other criterion. When a determination is made at 758, that a test pattern was not received successfully, an indication may be provided to the test manager. The result that a test pattern was not successfully received may be reported, for example by presenting an appropriate display screen to an operator, at 790 and the path verification test may optionally be terminated at 795.

When a determination is made at 758 that a test pattern has been received successfully (or when a test pattern is not successfully received and the path verification test is not automatically terminated), a determination may be made at 785 if one or more additional test patterns are expected. When an additional test pattern is expected, the actions from 750 to 758 may be repeated for each additional test pattern to be received. When a determination is made at 785 that no more test patterns are expected, an indication may be made to the test manager that all expected test patterns have been received. The result of the path verification test may then be reported at 790 and the test finished at 795.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A process for conducting a video path verification test between a source device and a destination device, comprising:
    a test manager instructing the source device and the destination device to conduct a video path verification test
    the source device transmitting a video signal including at least one video test pattern, wherein the video test pattern comprises periodic spatial modulation of one or more of a first component, a second component, and a third component of the video signal
    the destination device
        receiving the video signal from the source device via a network,
        filtering at least one video signal component of the received video signal with a band-pass filter matched to the periodic spatial modulation,
        integrating the at least one filtered video signal component over at least a portion of the test pattern,
        judging that a video path exists if the integrated filtered video signal component exceeds a predetermined threshold, and
        reporting a result of the video path verification test to the test manager.

2. The process of claim 1, further comprising:
    the source device coding the video signal and transmitting the coded video signal via the network as a sequence of packets
    the destination device receiving the sequence of packets and decoding the video signal prior to analyzing the received signal.

3. The process of claim 1, wherein
    the at least one video test pattern comprises a plurality of video test patterns received in sequence
    the destination device judges that a video path exists if each of the plurality of video test patterns meets at least one respective predetermined criterion.

4. The process of claim 1, wherein the test manager is a separate device from the source device and the destination device, the process further comprising:
    the test manager sending at least one message via the network to instruct the source device and the destination device to conduct the video path verification test
    the destination device sending a message via the network to report the result of the video path verification test to the test manager.

5. The process of claim 1, wherein the source device includes the test manager, the process further comprising:
    the source device sending at least one message via the network to instruct the destination device to conduct the video path verification test the destination device sending a message via the network to report the result of the video path verification test to the source device.

6. The process of claim 3, wherein each of the plurality of video test patterns differs from each other of the video test patterns in at least one of an amplitude and a spatial frequency of the periodic spatial modulation of one or more of the first, second, and third components of the video signal.

7. The process of claim 3, wherein each of the plurality of video test patterns is transmitted and received for a predetermined number of video frames.

8. A video-capable network device, comprising:
a packet receiver to receive video packets from a source via a network
a decoder to extract a video signal conveying a test pattern from the received packets, wherein the test pattern comprises periodic spatial modulation of a component of the video signal
an automatic test pattern analyzer to judge that a video path exists between the source and the video-capable network device if the video signal conveying the test pattern meets at least one predetermined criterion, the automatic test pattern analyzer comprising:
a band-pass filter to receive the component of the video signal, the filter tuned to the periodic spatial modulation
an integrator to receive a filtered video signal component from the band-pass filter, the integrator to integrate an output of the filter video signal over at least a portion of the image
a comparator that judges that a video path exists if an output of the integrator exceeds a predetermined threshold.

9. The video-capable network device of claim 8, wherein
the predetermined video test pattern comprises periodic vertical and horizontal spatial modulation of the component of the video signal
the band pass filter further comprises a vertical band-pass filter tuned to the vertical spatial modulation and a horizontal band-pass filter tuned to the horizontal spatial modulation.

* * * * *